Feb. 11, 1969 G. J. LASHER 3,427,563
MULTISTABLE DEVICE OPERATING ON THE PRINCIPLE
OF STIMULATED EMISSION OF RADIATION
Filed May 13, 1964 Sheet _1_ of 3

INVENTOR
GORDON J. LASHER

BY *John F. Ollandt Jr.*
ATTORNEY

Feb. 11, 1969          G. J. LASHER          3,427,563
MULTISTABLE DEVICE OPERATING ON THE PRINCIPLE
OF STIMULATED EMISSION OF RADIATION
Filed May 13, 1964

INTENSITY OF LIGHT OUTPUT FROM END 11

CURRENT PULSES INTO THE ABSORBER 19 OR EMITTER 18 CONTACTS

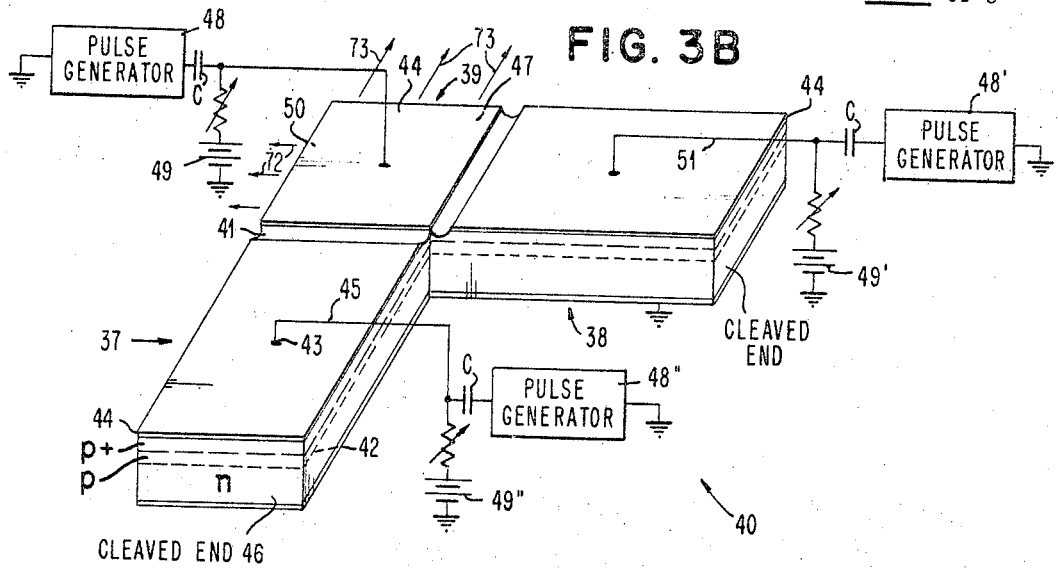
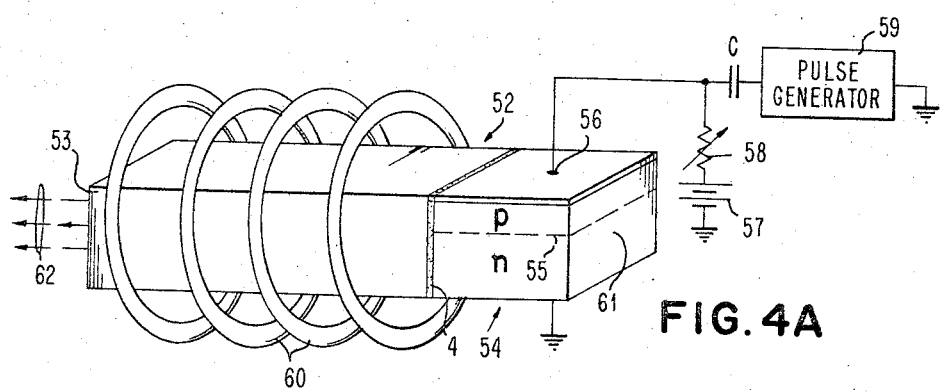
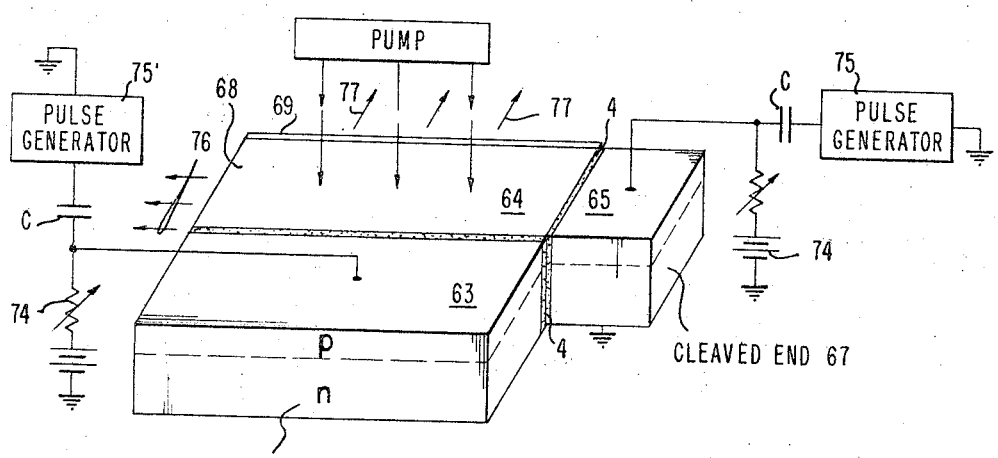

United States Patent Office 3,427,563
Patented Feb. 11, 1969

3,427,563
MULTISTABLE DEVICE OPERATING ON THE PRINCIPLE OF STIMULATED EMISSION OF RADIATION
Gordon J. Lasher, Briarcliff Manor, N.Y., assignor to International Business Machines Corporation, New York, N.Y., a corporation of New York
Filed May 13, 1964, Ser. No. 367,106
U.S. Cl. 331—94.5          17 Claims
Int. Cl. H01s 3/00, 3/16

ABSTRACT OF THE DISCLOSURE

A multistable device is provided wherein a laser is combined with a non-linear absorber or a plurality of non-linear absorbers to achieve a bistable or multistable device. A Fabry-Perot injection laser comprising a GaAs crystal is divided into two electrically insulated portions by a slot parallel to the light reflecting sides of the crystal. An injection current just below the threshold is passed through the main contact of the laser and the other contact of such laser is biased so that a slight injection current flows through the junction portion beneath the contact; the second portion of the GaAs crystal effectively acts as a non-linear absorber of light. Under the above conditions, the injection laser has two states, the first state in which it emits coherent light when the non-linear absorber bleaches and the second state when only light by spontaneous emission takes place and the non-linear absorber absorbs such spontaneous light. By surrounding the injection laser with a plurality of non-linear absorbers, first states (emission of coherent light) can be created in more than one direction through the injection laser. The disclosure also applies to optically pumped lasers and masers that emit in frequencies other than the visible. The non-linear absorbers are then selected to suit the outputs of the masers.

---

This invention relates to multistable devices and more particularly to combinations involving a maser with one or more non-linear absorbers, which combinations are capable of bistable and tristable operation with the same level of excitation.

During the past several years many interesting discoveries have occurred in the field of masers and optical masers, or lasers, as they have come to be known. The term "laser" is an acronym for "light amplification by stimulated emission of radiation." The laser involves an extension of the basic concepts of a maser first developed by A. L. Schawlow and C. H. Townes. For further information regarding these basic concepts, reference may be made to a paper entitled, "Infrared and Optical Masers," by the above authors, in the Physical Review, vol. 112, page 1940 (1958). In that article it has been pointed out that by suitable choice of an enclosure a system of radiating centers can be made to radiate coherently, to amplify and in general to display at optical wave lengths, most of the characteristics of the previously known maser which was operable in the microwave region of the electromagnetic spectrum.

More recently, the realization of laser action in semiconductor structures has been demonstrated. For reference to the subject of laser action in semiconductors the following articles may be consulted: (1) An article by R. J. Keyes and T. M. Quist in the Proceedings of the IRE, vol. 50, page 882, and (2) Applied Physics Letters, vol. 1, November 1962, page 62 by Nathan et al. Of course, early investigations in the semiconductor field had shown that light emission could be obtained in a semiconductor body due to the phenomenon of recombination radiation. However, such light emission was of conventional, incoherent type, not exhibiting the peculiar characteristics of coherent light, that is, light which is substantially monochromatic and undeviating in phase. As the term recombination radiation is understood in the semiconductor art, it refers to phenomenon where charge carriers, that is, holes and electrons, recombine and produce photons. This involves annihilating encounters between the aforesaid holes and electrons within the semiconductor body with the result that the carriers effectively disappear.

In the so-called injection laser, which was fully and practically embodied several years ago, the recombination radiation stemming from injection of carriers is such that inversion occurs within the generating medium—that is, within the semiconductor body—and stimulated emission of radiations results in the body, specifically in the infra-red region with a material such as gallium arsenide. Such stimulated emission of radiation is characterized by an abrupt narrowing of the emission line width of the light from a region in the immediate vicinity of the pn junction existing in the semiconductor body. The radiation in such a device is further characterized by a sharp increase in the light intensity in the direction of the junction plane at a high level of injected current.

In the achievement of coherent radiation within the semiconductor injection laser, the occurrence of the radiation immediately adjacent the junction has been enhanced by treating the surface of the semiconductor body so as to favor selectively the growth of a longitudinal mode. This longitudinal mode is known as the Fabry-Perot mode and is most favorably produced by preparing the semiconductive body so as to have a pair of end faces parallel and highly reflective and the other surfaces suitable for diffuse scattering. Normally, the highly reflective end faces are realized simply by cleaving the crystal so as to favor certain planes, which in the crystallographic structure are inherently parallel.

Since the practical realization of a small, coherent light source by reason of the development of the injection laser, many proposals have been made directed toward the end that bistability be achieved with such a coherent light device. Such operation would have enormous benefits in regard to the attainment of ultra-high speed storage elements which are useful for storing binary or binary coded decimal information in data processing machines. Such ultra-high speed is possible either (1) because it is a function of the recombination time, which is on the order of $10^{-9}$ sec., for the case of the coaction of an injection laser with a non-linear absorber of the same material, the absorber being biased below threshold; or (2) the speed is a function of the recombination time of the absorber (again $10^{-9}$ sec.), in the case where the emitter and absorbers are of different materials.

In the devices of the present invention to be described, the emitter frequencies do not have to be tuned by an external magnetic field and, additionally, it is possible to operate the devices at higher temperatures, such as room temperature, without excessive increases in the required pump power. Ease of fabrication is another important advantage with the devices of the present invention.

Accordingly, it is a primary object of the present invention to provide a multistable solid state element utilizing coherent radiation.

A further object is to attain radiation bistability in a solid state device.

With reference to the terms multistable and bistable which will be used in the specification, it is to be noted that the stable states referred to are radiation states. Thus, in the devices of the present invention and more particularly in a bistable device the first state is called the "on" state, in which the device emits coherent radiation, and the second state is one in which the device does not emit coherent radiation but rather simply exhibits spontaneous emission. The devices of the present invention may be switched from one of their states to another by suitable current pulses added to the steady injection current at the main contact or applied to an adjacent auxiliary contact. In addition, the devices of the present invention can also be switched between stable states by suitable light pulses.

The essential objects and advantages discussed above are realized by establishing certain interrelationships in the combination of an emitter of coherent radiation, i.e., a maser or laser, with a non-linear absorber; this combination can be embodied in a single crystal when the emitter is an injection laser, in which case fabrication is the simplest.

In accordance with a very specific embodiment, the device of the present invention consists of a Fabry-Perot injection laser with a plated p-type contact and the body is divided into two electrically insulated portions by a slot parallel to the light reflecting sides of the crystal. An injection current just below threshold is passed through the main contact and the other contact is biased so that a slight injection current flows through the junction portion immediately beneath the contact; the second portion effectively acts as a non-linear absorber of light. Under these conditions the injection laser has the aforesaid two states, the first in which it emits coherent light and in the second state only spontaneous light, both of the states being stable at the same injection current.

The non-linear absorbers which are used in combination with a maser or laser, in accordance with the present invention, are well known elements and a description of them may be obtained by referring to the IBM Journal of Research and Development, October 1963, pages 334–336. In particular, it should be noted that a non-linear or "bleachable" absorber is a material whose transmittance of a particular energy is a function of the intensity of the incident wave. In the specific cases to be described, this incident wave is an electromagnetic wave of microwave or light frequency although it is possible to observe a non-linear reaction for the absorption of waves of other frequencies. It is important that the quantum energy of the incident wave be slightly greater than the effective band gap of the absorbing material for the desired non-linear effect to occur. In general, a model non-linear absorber can be thought of as a material whose scattering centers (electrons) are raised to higher energy levels when the intensity of the input wave reaches a certain threshold level. These scattering centers (electrons) have a smaller cross section for the absorption of the input photons when they are in this excited level and hence the absorber is "bleached," allowing the photons to pass through it. In their initial state these electrons have a high cross-sectional probability for the absorption of the incident photon. Effectively, the optical density of the material is lowered when the electrons are in the higher energy state. The transmittance of this absorber will stay very high as long as the input intensity is sufficiently large enough to keep most of the electrons in this higher energy state (allowing for some recombination to take place). It is this property of non-linear absorbers, acting in combination with an energy emitting material, that makes it possible to have multistable operation.

The emitting systems here will be conventional III–V and II–VI injection lasers, optically pumped lasers, and also masers. Although reference will be made to a semiconducting or semi-insulating non-linear absorber, it should be realized that other suitable solids, liquids, or gases having bandgaps or absorption lines which match the bandgaps or emission lines of the emitting material, can be used to obtain multistable operation. For further background material reference may be made to a publication, Masers by J. R. Singer, Wiley & Sons, Inc., New York, N.Y., 1959.

The foregoing and other objects, features and advantages of the invention will be apparent from the following more detailed description of preferred embodiments of the invention as illustrated in the accompanying drawings.

In the drawings:

FIGURE 3B is a schematic diagram of a combination of an injection laser and two semiconducting non-linear absorbers which exhibit tristable operation.

FIGURE 4A is a schematic diagram of an optically pumped laser and a semiconductor non-linear absorber combination which exhibits bistable operation.

FIGURE 4B is a schematic diagram of a combination of an optically pumped laser and two semiconducting non-linear absorbers which combination exhibits tristable operation.

Figure 1A:
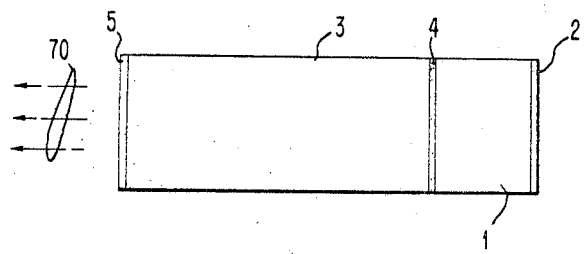
FIGURE 1A is an emitter and non-linear absorber combination which exhibits bistable operation according to the present invention.
Figure 1B:
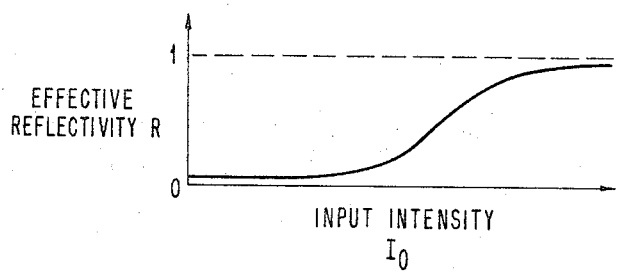
FIGURE 1B is a representation of the relationship of the effective reflectivity of the emitter and non-linear absorber combination of FIGURE 1A plotted against the intensity of the input electromagnetic energy.

Referring to FIGURE 1A, which shows an emitter and non-linear absorber combination that exhibits bistable operation, it is seen that the effective reflectivity of a slab 1 of semiconductor backed by a reflecting layer 2 is a function of the intensity of the incident radiation. This emitter 3 could be an injection laser, an optically pumped laser, or an optical maser; the non-linear absorber 1 could be a solid, liquid, or a gas as long as its bandgap is matched to that of the emitter 3. In this case, a suitable optical cement 4 is used to bond the emitter 3 and non-linear absorber 1. The width of the non-linear absorber 1 in the direction of incident electromagnetic energy should be greater than or comparable to the absorption length in order that the incident radiation be absorbed. At low intensities of input radiation, the incident radiation will be absorbed and then reradiated in random directions giving an effective reflection coefficient R for coherent light that is quite small. At very high incident intensities, enough electrons and holes will be created to reduce the absorption of input radiation, and hence the effective reflection coefficient R will increase the electromagnetic energy (shown by arrows 70) will be emitted from the side which has the partially reflecting coating 5. This effect is shown in FIGURE 1B where the effective reflection coefficient R is plotted against the intensity $I_o$ of input radiation. A lower limit for this curve will be $$R \geq \frac{I_o - I_c}{I_o}$$

where $I_c$ is the intensity absorbed at very high incident intensity.

Figure 2A:
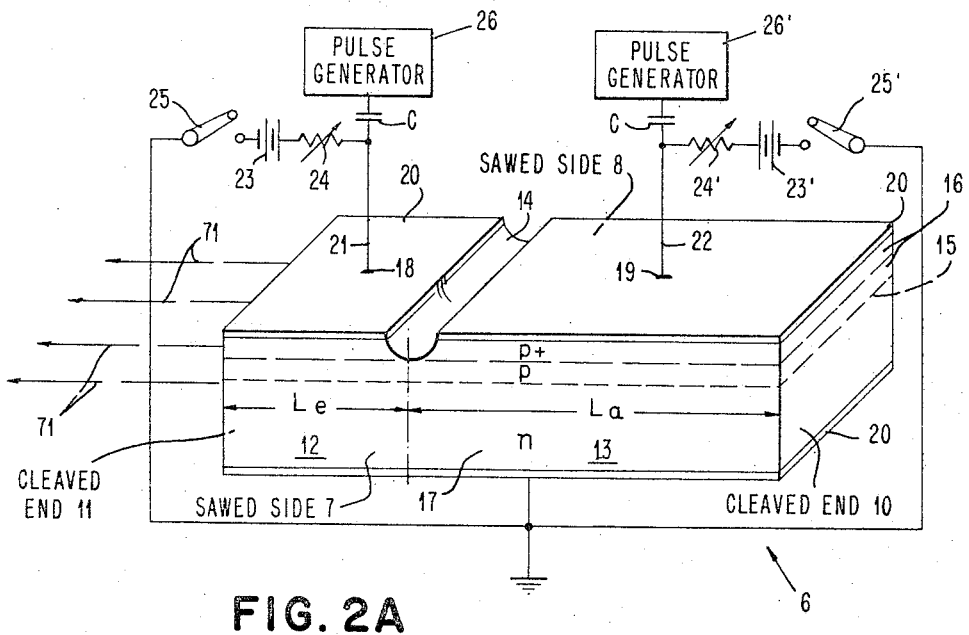
FIGURE 2A is a schematic diagram of an injection laser and semiconductor non-linear absorber combination which exhibits bistable operation.

Referring now to FIGURE 2A, there is shown a bistable device, comprised of a rectangular GaAs crystal 6 with Fabry-Perot optical modes, i.e., two opposite sides 7 and 8 of the four sides which intersect the pn junction 15 are roughened (sawed) and the other two 10 and 11 are optically smooth (cleaved) and preferably are coated with silver or another suitable material for high optical reflectivity. Its distinctive feature is the division of its plated positive contact into two electrically isolated sections 12 and 13. The slot 14 separating these sections 12 and 13 is parallel to the smooth sides 10 and 11 of the crystal 6, which has been selected to be monocrystalline.

The semiconductor crystal 6 contains a pn junction 15 separating a p region 16 and an n region 17. The device is constructed having the pn junction 15 essentially parallel to a major surface area thereof. This pn junction 15 is created by the diffusion of one conductivity type determining impurity, in this example, a p type determining impurity, into the crystal 6, already containing the opposite impurity type such that the net quantity of one conductivity type over the other defines two regions 16 and 17 of extrinsic conductivity type separated by a pn junction 15. In the particular embodiment shown in FIGURE 2A, the n region 17 is formed by doping with tellurium and the p region is formed by diffusing zinc into a {100} surface of the GaAs wafer. Because of the nature of the diffusion using zinc as the p type impurity, distinct layers of p+ and p material are produced. The entire wafer is then electroplated with gold, nickel and gold again, in this order, or with gold and then tin. This coating is then fired, forming ohmic contacts to the n and p sides (this is possible since the p layer is highly doped). Indium dots 18 and 19 are alloyed to this electroplating 20, after the slot 14 has been etched through the p+ layer. Indium dots 18, 19 are then used as alloy contacts to the plating 20 and leads 21 and 22 are attached. Leads 21 and 22 are appropriately connected to power sources (illustrated as batteries 23, 23′, series variable impedances 24, 24′ and switches 25, 25′) which serve to forward bias the pn junction 15 just below threshold. Pulse generators 26, 26′ are also provided to trigger the emitter 12 and absorber 13. It should still further be recognized that other injection laser materials may be utilized according to the teachings set forth here. These include gallium antimonide, indium phosphide, indium antimonide, indium arsenide and alloys of gallium arsenide-gallium phosphide containing less than 50% of gallium phosphide, as well as II–VI injection laser materials. It is only necessary to use materials which have a high radiative recombination probability and therefore are suitable substances in which stimulated emission can occur.

Fabrication of these bistable devices is very simple in the case where the emitter is an injection laser since, in this case, the emitter and non-linear absorbing materials can be identical and the device may be made from a single crystal; this is feasible since the energy states of the conduction and valence bands are continuous. In the case where tht emitter is an optically pumped laser or a maser, the quantum states of the conduction and valence bands of the emitting ion are discrete and different materials must be used for the emitter and non-linear absorber. It is only important that the maser frequency substantially coincide with the absorbing ion band edge, as is possible with a ruby light pumped laser and a cadmium selenide semiconductor absorber or a neodymium and glass pumped laser combined with a silicon semiconductor absorber. Two ruby crystals could also be used in which case the absorbing ruby crystal would be more heavily doped than the emitting ruby crystal. The reflector, which is bleached by the incident radiations, can be a light absorber due to an optically active impurity in a semiconductor or insulating material.

Referring again to FIGURE 2A, one section 12 of the sections 12 and 13, that are separated by the slot 14, is electrically biased to cause the injection of electrons into that portion of the p layer 16 directly beneath it and acts as the light-emitting section. The other section 13 has a somewhat smaller voltage so that a negligible injection current is present in that portion 13 which then acts as the light-absorbing section. The difference in potential may be as little as a tenth of a volt for GaAs and the necessity of dissipating the heat generated by the current passing between the two positive contacts 18 and 19 determines the minimum resistance between them. It is crucial to the operation of the device that the highest quality optical modes pass through both the emitting 12 and absorbing 13 regions of the junction 15 and that the light in these modes is not scattered or otherwise interrupted in passing between the two regions 12 and 13. It is also necessary that the dimensions and bulk resistivity of the p and n regions 16 and 17, respectively, are such that no sizable injection current flows through the absorbing region 13. The ratio $\alpha = L_a/L_e$ of the length of the light absorbing region 13 to that of the light emitting region 12 is an important parameter of this device and it will be shown that values of $\alpha$ comparable or greater than unity are desirable.

Figure 2B:
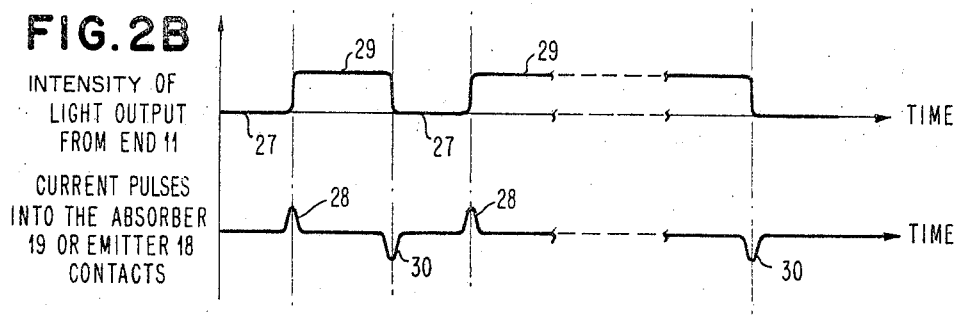
FIGURE 2B is a plot of light and current pulses depicting the bistable nature of the operation.

Referring to FIGURE 2B, it is seen that when the injection current is first turned on, the device will be in its off-state 27 (spontaneous light emission). A light quantum emitted by the recombination of electrons and holes in the emitting region 12 and travelling into the absorbing region 13 will be absorbed there, forming a new electron-hole pair. The recombination of this pair will emit light in random directions; consequently, the effective reflectivity R of the absorber 13 will be quite low, and there will be a high threshold for lasing. If, however, a sufficient number of conduction band electrons are formed in the absorbing region 13, the light from the emitting region 12 will not be so strongly absorbed and some will be reflected back by the totally reflecting side 10. The lasing threshold will then be reduced. To effect this momentary increase of electrons in the absorbing region 13, an additional current pulse 28 through the absorbing contact 19 or emiting contact 18, an external pulse of light entering the absorbing region 13, or an external light pulse travelling longitudinally from the emitter 12 to the absorber 13 can be employed. The emitter 12 will then emit coherent light into the absorbing region 13 and a coherent output 71 will be obtained from partially reflecting side 11. This corresponds to the on-state 29 of the device which state is distinguished by a coherent output beam 71. This on-state 29 will maintain itself after the duration of the aforesaid trigger pulse 28 since a strong optical mode will be set up in which the non-linear absorber 13 will remain bleached and the emitted coherent radition of the injection laser 12 will be reflected from the totally reflecting side 10 and will re-enter the emitter 12. The device can be returned to its off-state 27 by a negative trigger pulse 30 through the emitting 18 or absorbing contact 19, or by an external light pulse travelling transversely through the emitter region 12 (this transverse light pulse will be amplified and will remove energy from the strong longitudinal mode which is representative of the on-state 29). The complete crystal 6 can be contained within a liquid He or $N_2$ Dewar equipped with a transparent window.

Mathematically, the condition for bistability is shown as follows: consider the rate equations (1a) $$\frac{dn_e}{dt} = j/d - n_e/\tau - \sum_\omega S_\omega g(\omega, n_e)$$

(1b) $$\frac{dn_a}{dt} = -n_a/\tau - \sum_\omega S_\omega g(\omega, n_e)$$

(1c)
$$dS\omega/dt = V_E S_\omega g(\omega, n_e) + \alpha V_E S_\omega g(\omega, n_a) - S_\omega/\tau_\omega$$

where $n_e$, $n_a$ are uniform densities of electrons in the active layers of the light emitting and absorbing junctions, respectively.

$S_\omega$ = the number of photons in the Fabry-Perot modes of frequency, $\omega$ $j$ = injection current per unit area $d$ = thickness of the active layers in the diode $\tau$ = electron recombination life-time $g(\omega, n)$ = volume rate of stimulated emission into the $\omega$ mode for electron density $n$ $V_E$ = volume of the active layer of the light emitting region $\alpha = L_a/L_e$ = length ratio defined above $\tau_\omega$ = characteristic damping time of the $\omega$ optical mode The procedure here is to set the right-hand side of Equations 1a and 1b to zero and then solve for the quantity:

(2)
$$R_\omega(S_\omega) = V_E S_\omega [g(\omega, n_e) + ag(\omega, n_a)]$$
$$= V_E(j/d - n_e/\tau - n_a/\tau)$$

Assuming that only one mode will be strongly excited in the on-state, i.e. that only one $S_\omega$ differs from zero. The quantity $R_\omega S_\omega$ is the rate of stimulated emission into the $\omega$ mode when there are $S_\omega$ photons in that mode and none in other modes. If this quantity equals $S_\omega/\tau$, then Equation 1c will give zero for $dS_\omega/dt$ as well and a steady state solutions for all rate equations for the on-state will be obtained.

Figure 2C:
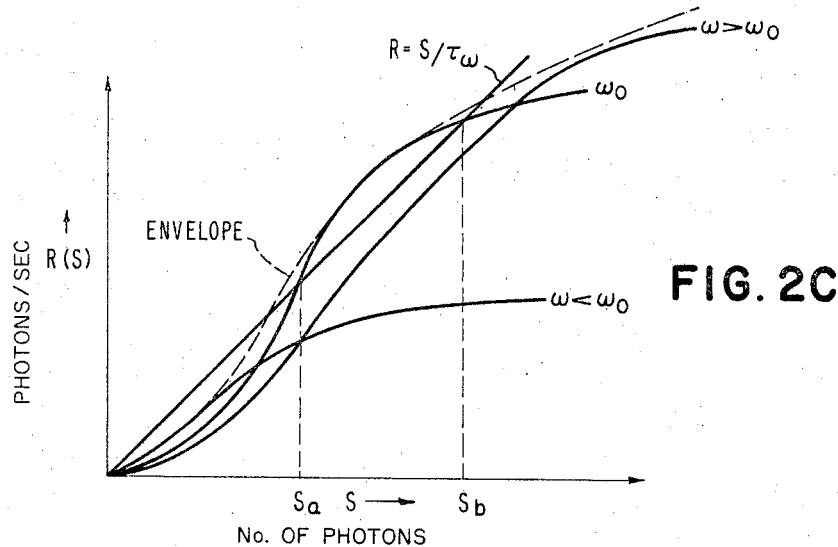
FIGURE 2C is a representative set of stimulated emission functions in which the ordinate is the net rate of stimulated emission and the abscissa is the photon population of a single mode.

FIGURE 2C shows some stimulated emission functions in order to discuss these solutions. If a function of the device has the shape labeled $\omega_0$ and two intersections with the straight line $R = S/\tau_\omega$ then that mode is bistable. When $S_{\omega_0}$ has an instantaneous value between zero and the value $S_a$ at the first intersection, the rate of stimulated emission is less than the rate of loss, and $S_{\omega_0}$ will decay to zero; this is the off-state. When $S_{\omega_0}$ lies between $S_a$ and $S_b$, the rate of stimulated emission exceeds the loss rate and the population of the $\omega_0$ mode will relax to the value $S_b$. This is the on-state. It is clearly necessary that the stimulated emission function be concave upward for small values of $S_\omega$. For the device to be stable in the off-state, it is necessary that the stimulated emission function for all modes lie below the "load line" $R = S/\tau_\omega$ for small values of $S_\omega$.

One way to determine if this is existent is to draw the envelope of the $R_\omega(S_\omega)$ curves for all $\omega$ and see if it has two intersections with the line $R = S/\tau_\omega$. This analysis has been carried out in the region of liquid helium temperatures and at 80° K. thus confirming bistable operation of the subject device.

Figure 3A:
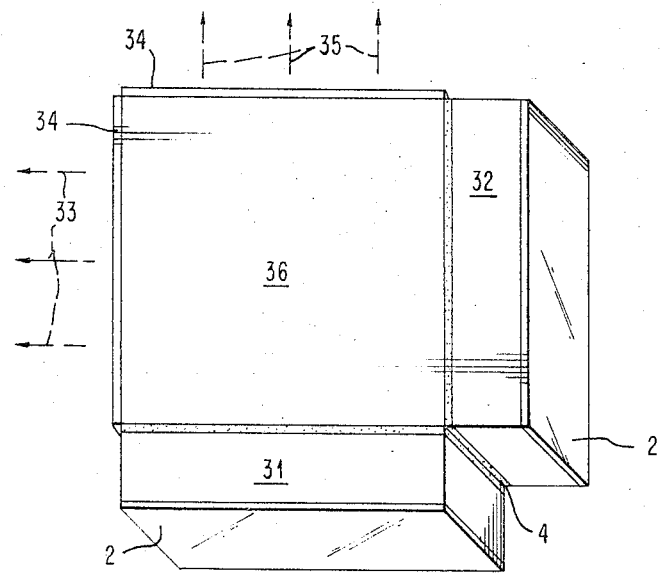
FIGURE 3A is a combination of an emitter and two non-linear absorbers which combination exhibits tristable operation according to the present invention.

Referring now to FIGURE 3A, it is seen that a second non-linear absorber 31 is added to the basic bistable configuration that is shown in FIGURE 1A. This device is capable of tristable operation in that two on-states and one off-state are now possible. One on-state can be achieved as in FIGURE 1A such that non-linear absorber 32 is bleached and a coherent output (indicated by arrows) 33 is obtained from partially reflecting coating 34. This corresponds to the first stable state of this device. The non-linear absorber 32 can be returned to its high attenuation state by suitable electrical or light pulses as has been previously described. If non-linear absorber 31 is bleached into a low attenuation state by an electrical or light pulse, a coherent output, which is indicated by arrows 35, will be noted from partially reflecting coating 34. This corresponds to the second stable state of this tristable device. When both non-linear absorbers 31 and 32 and in their high attenuation state and the emitter 36 is biased below threshold (no coherent outputs from coating 34) the third stable state is achieved. It is to be understood that, as in the bistable device configuration of FIGURE 1A, the emitter 36 could be any material which is capable of emitting electromagnetic energy of sufficient intensity to bleach the non-linear absorbers 31, 32; it is only important that the bandgaps of the emitter and non-linear absorbing ions be properly matched, as noted previously.

FIGURE 3B shows a semiconductor embodiment of the tristable device of FIGURE 3A with the non-linear absorber 37, transverse to the non-linear absorber 38. The emitting portion 39 of the configuration is the same as in FIGURE 1A and the complete tristable element 40 can be cut from the same wafer as was the bistable element 6 of FIGURE 2A. An additional slot 41 is etched in the crystal 40, the formation of a pn junction 42 in this new semiconductor absorber 37 having been done in the same step as in the case of a bistable element 6. An additional contact 43 is made into the plated face 44 of this non-linear absorber 37 and lead 45 is attached. Bias on this new absorber is the same as that on absorber 38 being such that only a negligible injection current flows through the junction 42 beneath it. Sides 46 and 47 are totally and partially reflecting, respectively. Pulse generators 48, 48' and 48" are provided for the emitter 39 and for each absorber 38, 37 respectively, as are DC sources 49, 49' and 49" respectively.

Tristable operation is achieved as follows: The on-state, utilizing absorber 38, can be achieved as described previously. This is indicated by a coherent output 72 from partially reflecting face 50. If a positive pulse is then applied to absorber 37 through lead 45 and a negative pulse to absorber 38 through lead 51, absorber 38 will return to its low reflectivity state and coherent light will be reflected from face 46 in the now bleached absorber 37; consequently, a coherent output 73 will be obtained from partially reflecting face 47. A negative pulse into absorbing contact 43 will return absorber 37 to its low reflectivity state and, therefore, no coherent output will result from either face 50 or face 47. The three stable states for the same level of emitter excitation are:

(1) *Off-state, mode 1*.—The injection laser emits spontaneous light, both absorber 38 and absorber 37 being in low reflectivity states.

(2) *On-state, mode 2*.—Coherent light output from face 50. Absorber 38 is bleached and absorber 37 is still in its low reflectivity state.

(3) *On-state, mode 3*.—Coherent light output from face 47. Absorber 37 is now bleached and absorber 38 is back into a low reflectivity state.

FIGURE 4A shows an optically pumped laser and non-linear absorber combination in which the emitting region is optically pumped; this configuration is capable of bistable operation. Here, this emitter could be a crystal, a liquid, or a gas, as long as the bandgap of the non-linear absorber is closely matched to that of the emitter. Because the optically pumped lasers have isolated quantum states in the valence and conduction bands, different materials must be used for the emitter and the non-linear absorber. Various laser crystals can be used here, such as ruby, calcium fluoride doped with divalent samarioum or trivalent uranium, lithium fluoride doped with hexavalent uranium, glass laser rods, neodyminum doped calcium tungstate, etc.

In the preferred embodiment that is shown in FIGURE 4A, the optical crystal 52 is a cylinder of rectangular cross section whose surface is left ground. The ends are polished and made highly parallel across the end surfaces. Face 53 is coated with a partially reflecting coating while the other face is joined to the non-linear absorber 54 by the optical cement 4. This non-linear absorber 54 is the same as was described with reference to FIGURE 2A, being a single crystal of GaAs in which a pn junction 55 exists. It has a plated positive contact 56 to the p side of the junction while the n side is grounded. A D.C. source, shown by the battery 57 and a variable resistor 58 is provided, as is a pulse generator 59 for obtaining trigger pulses. Face 61 of this non-linear absorber 54 has been cleaved and is totally reflecting. The emitter 52 is provided with an optical pumping source 60, such as an xenon flash lamp, which is arranged spirally around the crystal 52.

Operation of this bistable device is analogous to that of the device of FIGURE 2A, the only difference being that here a light source is used to create the necessary population inversion, while the injection laser case carriers are injected into the solid state material in order to obtain the necessary population inversion. If the non-linear absorber 54 is a suitably biased pn junction, as is shown in FIGURES 2A and 4A, the operation of this bistable device is identical to that of the device of FIGURE 2A.

In its off-state, the crystal 52 emits only spontaneous radiation for a particular intensity of pumping radiation. This spontaneous emission does not bleach the non-linear absorber 54 which is also biased below its lasing threshold, so that it remains in its low reflectivity state. No coherent output is noted from face 53, and the threshold for lasing is consequently very high. The lasing threshold is reduced by a current pulse through the absorbing contact 56, an external pulse of light entering the absorbing region 54, or an external pulse of light travelling longitudinally from the emitter 52 to the absorber 54. The emitter 52 will then emit coherent light into the absorber region 54 which will be reflected from face 61 and a coherent output, denoted by arrows 62, will be observed from partially reflecting face 53. This corresponds to the on-state of the device, which state is distinguished by a coherent output beam. This on-state will maintain itself after the duration of the aforesaid trigger pulse since a strong optical mode will be set up in which the non-linear absorber 54 will remain bleached and the emitted coherent radiation will be reflected from the absorber 54. The device can be returned to its off-state by a negative trigger pulse through the absorbing contact 56, or by an external light pulse travelling transversely through the emitter region. The complete device can be contained with an He or $N_2$ Dewar equipped with a transparent window.

Tristable operation is possible if another non-linear absorber 63 is placed adjacent to the lasing crystal 64 but transverse to the first non-linear absorber 65, as is shown in FIGURE 4B. Ends 66, 67 are cleaved while faces 68, 69 are partially reflecting. D.C. sources 74, 74' and pulse generators 75, 75' are provided for the semiconductor non-linear absorbers 63, 65.

It should be understood by one skilled in the art that the configuration of this tristable device is completely analogous to that of FIGURE 3A. Further, it is to be understood that tristability is achieved in an exactly analogous way to that explained previously with reference to FIGURES 3A and 3B, coherent outputs 76, 77 denoting on-states and no coherent outputs designating the off-state.

It is to be still further understood that the emitting portion of either bistable or a tristable element could be an optically pumped maser in which the coherent output, which corresponds to the on-state of the device, is now in the microwave portion of the electromagnetic spectrum. In this particular case, a suitable non-linear absorber must be chosen that will bleach at a certain threshold intensity of incident microwaves. Construction of such a device is completely parallel in all respects to that of the optically pumped laser and non-linear absorber combinations shown in FIGURES 4A and 4B.

It is apparent that this concept generalizes to a device with $n+1$ stable states by having the emitter in the form of a regular polygon with $2n$ sides and placing non-linear absorbers on one side of each pair of opposite sides, reflecting coatings on the outside of each absorber, and partially reflecting coatings on each side of the emitter not bearing an absorber.

While the invention has been particularly shown and described with reference to preferred embodiments thereof, it will be understood by those skilled in the art that the foregoing and other changes in details may be made therein without departing from the spirit and scope of the invention.

What is claimed is:

1. A maser device having at least two well-defined stable radiation states, in one of which said device exhibits spontaneous emission of radiation and in another, stimulated emission of radiation, comprising,
    an emitter portion and integral therewith at least one non-linear absorber, said emitter portion and non-linear absorber being located in a resonant cavity of said maser device, said non-linear absorber being capable of absorbing electromagnetic energy from said emitter portion and also capable of having its absorption substantially reduced so that the effective reflection coefficient of the device is increased,
    means for placing said emitter portion in its spontaneous emission state, and
    means for affecting the non-linear absorber such that the effective reflection coefficient is changed whereby said device changes to its stimulated emission state.

2. A maser device as defined in claim 1 wherein said means for affecting the non-linear absorber comprises a contact to said maser device and a pulse generating means connected to said contact.

3. A maser device as defined in claim 1 wherein said means for affecting the non-linear absorber is a source of radiation directed onto said maser device.

4. A maser device having at least two well-defined stable radiation states, in one of which said device exhibits spontaneous emission of radiation and in another, stimulated emission of radiation, comprising
    an emitter portion and integral therewith at least one non-linear absorber, said emitter portion and non-linear absorber being located in a resonant cavity of said maser device, said non-linear absorber having a transmittance which is very high as long as the input intensity to said absorber is sufficiently large enough to keep most of the electrons in a high energy state and whose transmittance is very low as long as the input intensity is small so that electrons remain at a lower energy state, and
    means for changing the transmittance of the non-linear absorber between the one state in which the transmittance is very high to the other state in which it is very low.

5. A maser device as defined in claim 4 wherein said means for changing the transmittance of the non-linear absorber comprises a contact to said maser device and a pulse generating means connected to said contact.

6. A maser device as defined in claim 4 wherein said means for changing the transmittance of the non-linear absorber is a source of radiation directed onto said maser device.

7. A maser device having two well-defined stable radiation states, in one of which said device exhibits spontaneous emission of radiation and in the other stimulated emission of radiation comprising;
    an emitter section capable of spontaneous emission of radiation and having a threshold above which said emitter section is capable of producing stimulated emission,
    an absorbing section integral with said emitter section and having non-linear absorption characteristics such that said absorber section absorbs electromagnetic energy under one set of conditions and is bleachable such that it does not absorb radiation under a second set of conditions, said second set of conditions affecting the reflection coefficient for coherent light, said emitter section and absorbing section being located in a resonant cavity of said maser device, and
    means for transferring said absorbing section from its absorptive to its non-absorptive state whereby the reflection coefficient and hence the threshold for coherent light is altered and said device changes from its spontaneous emission state to its stimulated emission state.

8. A maser device as defined in claim 7 wherein said means for transferring said absorbing section comprises a contact to said maser device and a pulse generating means connected to said contact.

9. A maser device as defined in claim 7 wherein said means for transferring said absorbing section is a source of radiation directed onto said maser device.

10. An injection laser device having two well-defined stable radiation states, in one of which said device exhibits spontaneous emission of radiation and in the other stimulated emission of radiation comprising;

an integral monocrystalline semiconductor body having a pn junction therein parallel to two opposed major surfaces of said body, an emitter section in said body capable of spontaneous emission of radiation and having a threshold above which said emitter section is capable of producing stimulated emission, and an absorbing section in said body having non-linear absorption characteristics, said emitter section and absorbing section lying within a resonant cavity of said maser device.

11. An injection laser device as defined in claim 10 wherein said absorber section comprises a contact to said injection laser and a pulse generating means connected to said contact.

12. An injection laser device as defined in claim 10 wherein said absorber section is a source of radiation directed onto said injection laser device.

13. An injection laser device as defined in claim 10 wherein said semiconductor body is constituted of GaAs.

14. An injection laser device having at least two well-defined stable radiation states, in one of which said device exhibits spontaneous emission of radiation and in another, stimulated emission of radiation comprising, an integral semiconductor body having a slot therein thereby separating said body into an emitter section and an absorber section, ohmic contacts to each of said emitter section and absorber section on one major surface of said body, an ohmic contact to the opposed major surface of said body, means for biasing said emitter section so that an injection current flows in said emitter section which is below the threshold for producing a coherent radiation, and means for biasing said absorber section so that said absorber section has a very slight injection current flowing therethrough whereby said absorber section acts to absorb electromagnetic energy from said emitter section and means for changing the conditions of operation for said absorber section such that said absorber section is bleached thereby to allow a high intensity of radiation to pass through said absorber section whereby said device changes from its spontaneous emission state to its stimulated emission state.

15. An injection laser device as defined in claim 14 wherein said means for changing the state of said absorber section includes a pulse generator connected to said ohmic contact on said absorber section.

16. An injection laser device as defined in claim 14 wherein the length of said absorber section $L_a$ is greater than the length $L_e$ of said emitter section.

17. A maser device having at least two well-defined stable radiation states, in one of which said device exhibits spontaneous emission of radiation and in another, stimulated emission of radiation, both states being exhibited at the same level excitation, comprising, an emitter portion and integral therewith at least one non-linear absorber, said emitter portion and each non-linear absorber lying within a resonant cavity of said maser device, said non-linear absorber being capable of absorbing electromagnetic energy from said emitter portion and also capable of having its absorption substantially reduced so that the effective reflection coefficient of the device is increased, means for placing said emitter portion in its spontaneous emission state, and means for affecting the non-linear absorber such that the effective reflection coefficient is changed whereby said device changes to its stimulated emission state.

References Cited

UNITED STATES PATENTS

| | | | |
|---|---|---|---|
| 3,270,291 | 8/1966 | Kosonocky | 331—94.5 |
| 3,303,431 | 2/1967 | Fowler | 331—94.5 |

JEWELL H. PEDERSEN, *Primary Examiner.*

WILLIAM L. SIKES, *Assistant Examiner.*

U.S. Cl. X.R.

307—200; 250—211